United States Patent [19]

Desbarats

[11] 3,931,864
[45] Jan. 13, 1976

[54] AIR SUSTENSION PROPULSION
[76] Inventor: William Edouard Desbarats, 1577 Watts St., Chambly, Quebec, J3I 2Z3, Canada
[22] Filed: Jan. 27, 1975
[21] Appl. No.: 544,552

[52] U.S. Cl. .............................. 180/116; 180/120
[51] Int. Cl.² ........................................... B60V 1/14
[58] Field of Search ........... 180/116, 117, 120, 121, 180/122, 126, 129, 130

[56] References Cited
UNITED STATES PATENTS

| | | | |
|---|---|---|---|
| 1,907,160 | 5/1933 | Schauman | 180/117 X |
| 3,198,274 | 8/1965 | Cocksedge | 180/117 X |
| 3,262,510 | 7/1966 | Froehler | 180/117 X |

FOREIGN PATENTS OR APPLICATIONS

| | | | |
|---|---|---|---|
| 944,504 | 12/1963 | United Kingdom | 180/120 |

Primary Examiner—Leo Friaglia
Assistant Examiner—Terrance L. Siemens

[57] ABSTRACT

A vehicle which is supported and propelled by pressurized air. A stream of pressurized air is directed from at least one nozzle means away from the bottom of the body of the vehicle. The stream is directed at an acute angle to the bottom of the vehicle. At least one deflecting surface is provided on the bottom of the body of the vehicle in a position, when the vehicle is operating, to receive the stream when it is deflected from the surface being traversed by the vehicle, and to deflect the stream back toward the traversed surface.

11 Claims, 9 Drawing Figures

AIR SUSTENSION PROPULSION

This invention is directed toward a novel air supported and propelled vehicle.

Air supported vehicles, one of the type riding on a cushion of air, are quite well known. These vehicles have means for creating a cushion of pressurized air which cushion is maintained beneath the vehicle by suitable retaining means to lift and support the vehicle. These retaining means usually comprise a flexible skirt surrounding the vehicle. Propulsion means such as propellors, or jets of pressurized air directed laterally from the vehicle, propel the vehicle while supported on the air cushion. Vehicles of this type have the advantage of being able to travel over different surfaces such as water, land, ice, swamp, etc.

These vehicles do however have certain disadvantages. They are relatively unstable when in operation; are difficult to directionally control; are mechanically complicated; have a vulnerable skirt system for retaining the air cushion; and have low power utilization efficiency.

It is the purpose of the present invention to provide a novel air supported and propelled vehicle which retains the advantage of air cushion vehicles in their ability to travel over different surfaces while at the same time eliminating, or at least minimizing, their disadvantages.

The vehicle of the present invention has good stability; good directional control; requires no flexible skirt or their means for retaining an air cushion; is mechanically simple; and has a relatively high power utilization efficiency. In particular, the vehicle of the present invention as compared to an air cushion type vehicle, provides a greater lifting force for the vehicle from the same power output. A greater proportion of the power output of the vehicle is thereby available for thrust. Alternatively a smaller power output can be employed for a vehicle of the same gross weight as an air cushion vehicle.

The vehicle of the present invention directs at least one, and preferably a plurality, of streams of pressurized air down and away from the bottom of the vehicle at an angle to the vehicle bottom to support and propel the vehicle. At least one planar surface is provided on the bottom of the vehicle, for each stream, to receive the associated stream as it is deflected back from the surface travelled over by the vehicle and to redeflect it back to the surface. This feature of at least one redeflecting surface on the vehicle for each pressurized air stream, provides a greater lifting force for the vehicle to support it for a particular power output as compared to the lifting force provided in an air cushion vehicle having the same power output.

The invention is particularly directed toward a vehicle having a body and means carried by the body providing a source of pressurized air. At least one nozzle means is provided in the bottom of the vehicle body for directing a stream of the pressurized air from the body to support and propel the vehicle. The stream is directed from the body at an acute angle to the bottom. At least one deflecting surface is provided on the bottom of the body, located relative to the nozzle means to receive the stream when it is deflected off the surface being transversed by the vehicle, and to deflect it back toward the traversed surface.

The invention will now be described in detail having reference to the accompanying drawings in which.

Figure 1:
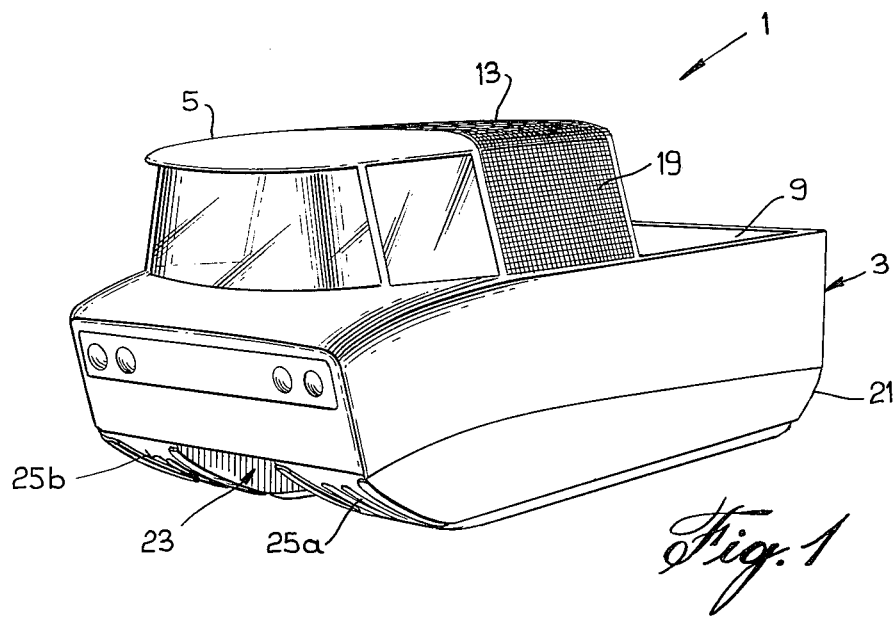
FIG. 1 is a top perspective view of the vehicle of the present invention.
Figure 2:
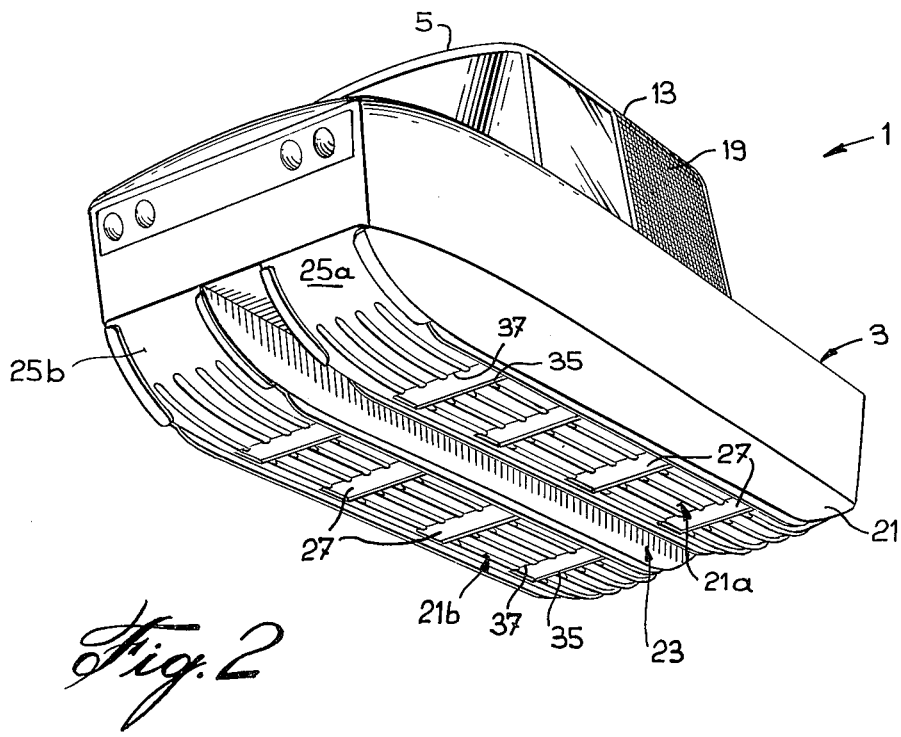
FIG. 2 is a bottom perspective view of the vehicle.
Figure 3:
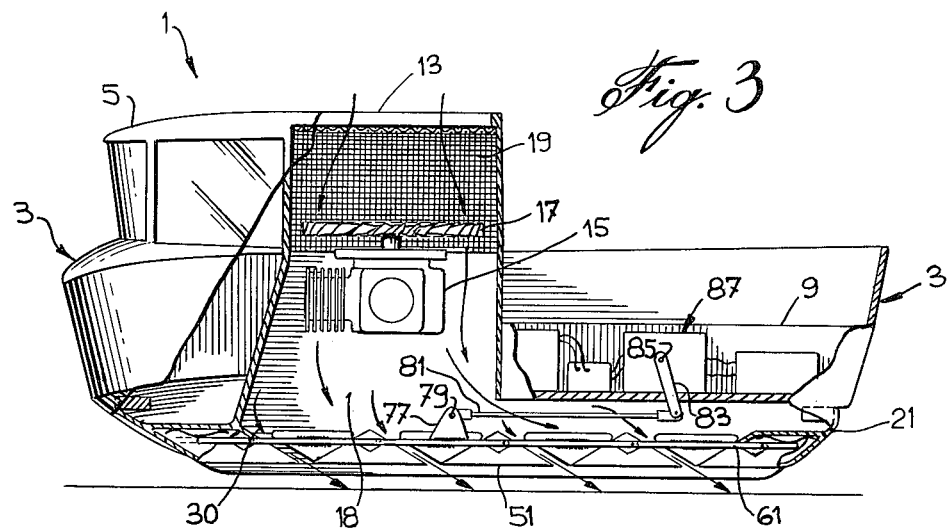
FIG. 3 is a side elevation view of the vehicle in partial cross-section.

The vehicle 1 of the present invention, as shown in FIGS. 1, 2 and 3, has a hull or body 3. A cab 5 can be provided at the front of the body 3 for the vehicle operator and passengers. An open deck 9 can be provided at the rear of the body 3 for receiving cargo. Intermediate the front and rear of the body 3, an engine compartment 13 is provided housing an engine 15 and fan 17. The fan 17 draws in, and compresses, air to provide a source of pressurized air in a lower chamber 18 for supporting and propelling the vehicle as will be described. The upper walls 19 of the engine compartment 13 have screens or slots through which outside air is drawn by the fan 17 into the engine compartment 13.

The base 21 of the body 3 is preferably divided into two longitudinal extending parallel sections 21a, 21b by a central, longitudinal extending well 23. The sections 21a, 21b are symmetrical with the central longitudinal axis of the vehicle. The front portions 25a, 25b of base sections 21a, 21b curve upwardly toward the front of the body 3. Each base section 21a, 21b is provided with a plurality of longitudinally spaced-apart outlet ports 27. Each outlet port 27 is rectangular and extends transversely across the base section.

Figure 7:
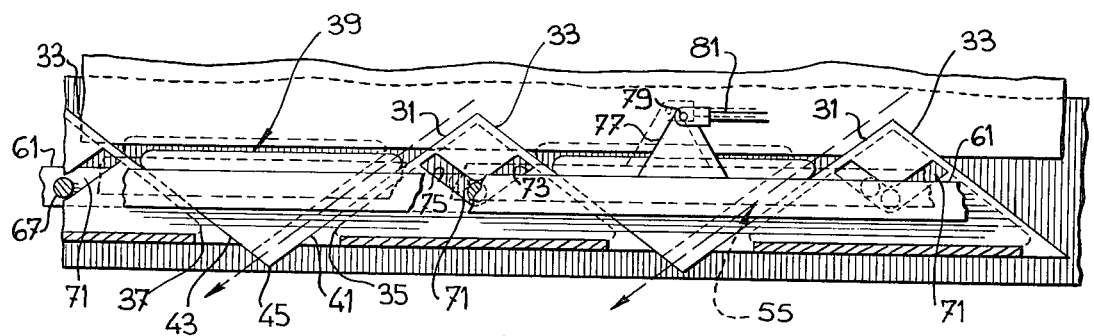

Each outlet port 27 has a nozzle means 29 associated with it for directing pressurized air from the vehicle to lift, support and propel the vehicle. Each nozzle means 29 includes a chamber 30 defined by a pair of side walls 31, 33 which extend up from port 27, and more particularly the long side edges 35, 37 of the port, and which diverge away from each other. Chamber 30 is in direct communication with lower chamber 18. A nozzle chamber 39 is mounted in the chamber 30 between the side walls 31, 33. The nozzle member 39 is of triangular cross-section and has side walls 41, 43 which slope down toward each other to converge at a bottom edge 45 as shown in FIG. 7. The side walls 41, 43 of the nozzle member 39 each extend at an angle $\alpha$ to the horizontal as do the side walls 31, 33 of chamber 30. The nozzle member 39 is sized so that when it is in a first position, with its one wall 41 against wall 31 and its bottom edge 45 adjacent side edge 35 of the outlet port 27, its other wall 43 is spaced from, but parallel to, other wall 33 of chamber 30, forming a channel 47. Channel 47 communicates, at its top end, with the chamber 18 for directing pressurized air downwardly and rearwardly from port 27 to lift and propel the vehicle forwardly. The pressurized air stream 49 emerges from port 27 at an angle $\alpha$ to strike the surface "S" over which the vehicle traverses.

It is essential to the present invention that a planar deflecting surface area 51 be provided behind each outlet port 27. The surface area 51 is substantially parallel to the surface "S" and must be located a distance rearwardly from the port 27 such that, when the vehicle is in operation and raised slightly from ground surface "S", the stream 49 emerging from port 27, is deflected at least once from ground surface "S" back onto planar surface area 51. The planar surface area 51 preferably comprises a portion of the plane surface 53 of base 21 between each pair of adjacent outlet ports 27. Preferably, the ports 27 are spaced apart a distance such that two deflecting surface areas, 51a, 51b are provided by surface 53 between adjacent ports 27 so that each stream 49 emerging from each port 27 is deflected from the ground "S" back to the vehicle base at least twice, when the vehicle is operating.

The streams of air 49 emerging downwardly and rearwardly from all the outlet ports 27 serve both to lift the vehicle, to support it and to propel it forwardly. The vehicle can also be propelled rearwardly by moving the nozzle member 39 in each chamber 30 forwardly to a second position so that the one wall 41 of member 39 is now spaced from, but parallel to, wall 31 of chamber 30 to form a channel 55, (shown being formed in FIG. 7) which extends downwardly and forwardly. Wall 43 of member 39 is now adjacent wall 33 of chamber 30 eliminating channel 47. A stream of air now emerges from each port to lift and propel the vehicle rearwardly. At least one, and preferably two surface areas are provided in front of each slot 27 to receive the stream from each slot as it is deflected back once or twice from the ground. These surface areas, except for the most forward slot, comprise the rearwardly positioned areas 51 of adjacent forward slots when the vehicle is moving forwardly.

Means are provided for moving the nozzle members 39 in each base section 21a, 21b in unison between their first and second positions. These moving means for each base section include a pair of horizontal, parallel support bars 61 located on either side of the nozzle members 39 in each base section. Each bar 61 is connected to one end 63 of each nozzle member 39 by a short connecting piece 65. Each bar 61 also carries a plurality of camming pins 67 projecting inwardly. End walls 69 join adjacent side walls 31, 33 of adjacent chambers 30. Angular cam slots 71 are provided in these end walls with the two arms 73, 75 of each slot 71 extending up and away from each other, each at an angle $\alpha$ to the horizontal.

Each bar 61 is connected, via a bracket 77 and pin 79 to an actuating rod 81 extending substantially parallel to, and above bar 61. The rod 81 is connected at its other end, as shown in FIG. 3 to a crank arm 83 which in turn is connected to a shaft 85 rotatable by suitable motive means 87.

In operation, to change from forward to reverse drive, the nozzle members 39 in each base section 21a, 21b can be moved in unison from a first position, where rearwardly directed channels 47 are formed between walls 33, 43, and where each cam pin 67 is at the top of arm 73 in slot 71 adjacent the channel. The nozzle members 39 are moved down and forwardly by actuating motive means 87 to move bars 61 to which the nozzle members are attached. The movement continued until each nozzle member 39 abuts on both walls 31, 33 of chamber 30 and pin 67 is at the bottom of slot 71. The movement is continued to move the members up the other side to the second position to form channel 55 with pin 67 moving up to the end of arm 75 of slot 71. FIG. 7 illustrates the nozzle members 39, in dotted lines, moving up to the second position. Side walls 31, 33 of chamber 30 limit movement of pin 67 in slot 71.

The pressurized air is maintained in lower chamber 18, and chambers 30, by side plates 87.

Figure 8:
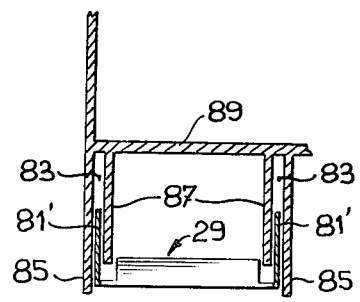
FIG. 8 is a detail cross-sectional view showing one type of nozzle sealing means.
Figure 9:
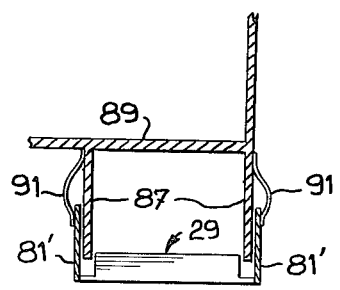
FIG. 9 is a detail cross-sectional view showing another type of nozzle sealing means.

Means can be provided for vertically adjusting the nozzle means and deflecting surfaces relative to body 3 if desired. In one embodiment, as shown in FIG. 8, the walls 31, 33 forming the chambers 30 are attached, via their end walls 69, to longitudinal plates 81'. The plates 81' are retained in vertical slots 83 formed between side walls 85, 87 depending down from bottom wall 89 of chamber 18. The plates 81' are free to move a limited amount in the slots 83 to provide vertical adjustment for the nozzle means and deflecting surfaces. Alternatively, plates 81' can be attached to bottom wall 89 by flexible seal members 91 as shown in FIG. 9. In this embodiment, outer side wall 85 can be dispensed with.

To steer or turn the vehicle, the nozzle members in one base section 21a can be placed, in unison in the opposite position to the position of the nozzle members in the other base section 21b. This imparts turning forces about the vertical central axis of the vehicle, in either direction, depending on which set of nozzles are in which position.

Figure 4:
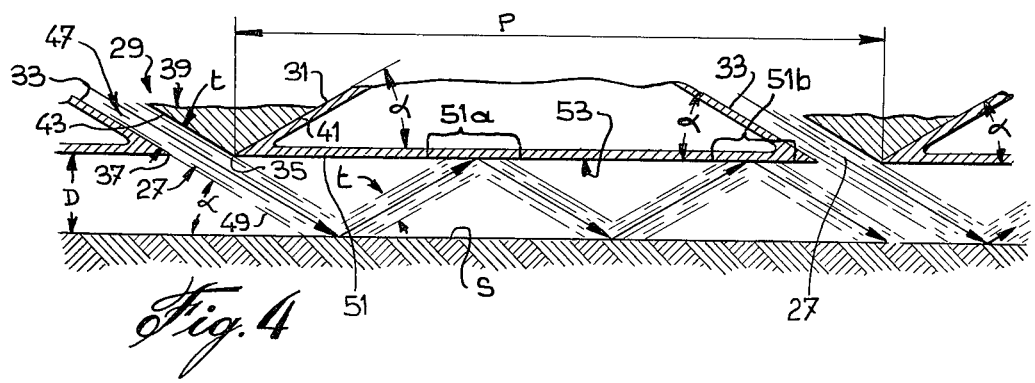
FIG. 4 is a detail view of the nozzles in the vehicle.
Figure 5:
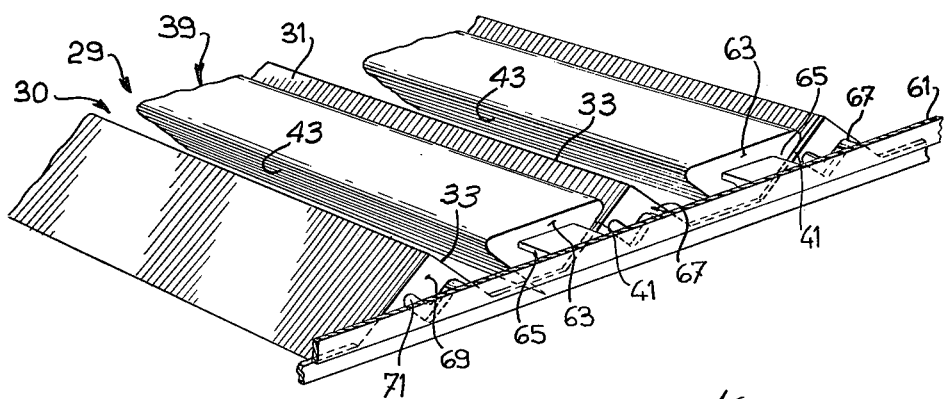
FIG. 5 is a perspective view of a portion of the nozzles including their moving means.
Figure 6:
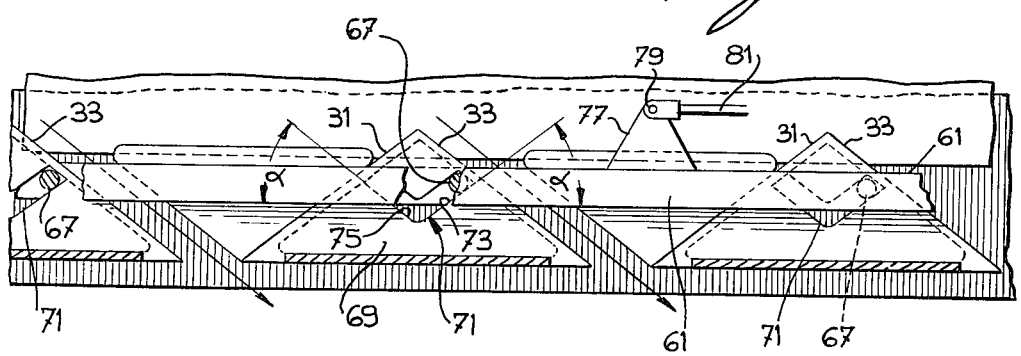
FIGS. 6 and 7 are detail elevation views of the nozzles and their moving means, in two different positions.

In employing an arrangement whereby the air stream from each nozzle can be directed against the base of the vehicle at least once and preferably twice, by deflection off the ground surface, additional lift is provided for the vehicle without the use of additional power. With the present invention, the ideal total lift L obtained can be expressed (having reference to FIG. 4) by the formula:

$$L = \frac{D + P \tan \alpha}{D} (\sin \alpha)(MV) \qquad (1)$$

where:
L = Total lifting force
D = Distance of the base above the ground surface "S"
P = Effective length of base surface associated with each nozzle
$\alpha$ = Angle of exiting air stream with respect to base surface
M = Total air mass flow through all nozzles; and
V = Mean velocity of air stream exiting from each nozzle.

The ideal total thrust T imparted to the vehicle can be expressed by the formula:
$$T = \cos \alpha (MV) \qquad 2$$

In order for the present invention to operate, it is essential that the base surface be long enough to provide at least one reflecting surface. Thus,
$$P > 2D/\tan \alpha \qquad 3$$

Also, the base must be high enough off the ground to allow the air stream, having a thickness $t$, to reflect between the base and ground. Thus,
$$D > t/\cos \alpha \qquad 4$$

The above formula is satisfied by supplying sufficient power at the outlet of the nozzles. From equations 1 and 4 it can be shown that the minimum power required can be expressed by the formula:

$$P \min. (= MV) > \frac{Lt}{t(\sin \alpha) + P(\sin^2 \alpha)} \qquad (5)$$

where L is equal to the gross weight of the vehicle.

The above formulas are for ideal conditions with the following assumptions:

A. The air stream emanating from each nozzle is non-viscous, perfectly elastic and unidirectional.

B. The ground surface traversed by the vehicle is uniformly smooth and parallel to the base surface of the vehicle.

C. The air stream has an initial zero velocity relative to the vehicle.

D. Each nozzle and reflecting base surface is identical.

These assumptions do not induce large errors and the theoretical results are fairly close to actual results as shown by laboratory testing. The testing indicates that the nozzle angle α should range between 20° and 40° to provide optimum results. Only six to 24 percent of the total power available is needed to provide the necessary lift depending on ground clearance and hillclimbing requirements.

I claim:

1. A vehicle having a body, means carried by the body providing a source of pressurized air, at least one nozzle means in the bottom of the vehicle body for directing a stream of the pressurized air from the body to support and propel the vehicle, the stream directed from the body at an acute angle, to the bottom, and at least one deflecting surface on the bottom of the body, located relative to the nozzle means to receive the stream, when deflected off the surface being traversed by the vehicle, and to deflect it back toward the traversed surface.

2. A vehicle as claimed in claim 1, having a plurality of nozzle means in the bottom of the vehicle body for directing streams of the pressurized air from the body to support and propel the vehicle, each nozzle means having an associated deflecting surface.

3. A vehicle as claimed in claim 2, having another deflecting surface on the bottom of the body located relative to each nozzle means to receive the stream when deflected off the surface being traversed by the vehicle, and to deflect it back toward the traversed surface, the other deflecting surface of each nozzle means located on one side of the nozzle means opposite to the one deflecting surface, and means for selectively positioning the nozzle means, in unison, between one of two positions, the nozzles, in one position, directing the streams rearwardly of the body to deflect off the one surfaces to propel the vehicle forwardly; the nozzles, in the other position, directing the streams forwardly of the body to deflect off the other surfaces to propel the vehicle rearwardly.

4. A vehicle as claimed in claim 2, wherein the nozzle means are arranged in two parallel rows extending longitudinally of the body, the rows symmetrical with respect to the longitudinal axis of the body.

5. A vehicle as claimed in claim 4, having another deflecting surface on the bottom of the body located relative to each nozzle means to receive the stream when deflected off the surface being traversed by the vehicle, and to deflect it back toward the traversed surface, the other deflecting surfaces of each nozzle means located on one side of the nozzle means opposite to the one deflecting surface, and means for selectively positioning each row of nozzle means, in unison, between one of two positions, the nozzles, in one position, directing the streams rearwardly of the body to deflect off the one surfaces to tend to propel the vehicle forwardly; the nozzles, in the other position, directing the streams forwardly of the body to deflect off the other surfaces to tend to propel the vehicle rearwardly; the vehicle turned by positioning one row of nozzles in one position and the other row of nozzles in the other position.

6. A vehicle as claimed in claim 3, wherein each nozzle means comprises a pair of fixed walls extending transversely of the body, the walls converging down toward each other to define a narrow transverse slot in the bottom, a member movably mounted in the space between the fixed walls, the member having two walls extending transversely of the body, the walls converging down toward each other at the same angle as the fixed walls, the selectively positioning means comprising means for moving the member between the fixed walls to have one of its walls abutting one of the fixed walls and the other of its walls spaced from the other fixed wall to define a channel leading to the slot.

7. A vehicle as claimed in claim 6, wherein the moving means comprise a pair of bar members extending longitudinally of the body, one on each side of the nozzle members, and attached to each nozzle member on its sides, cam surfaces on the sides of the fixed walls, and cam followers on the bar members cooperating with the cam surfaces to guide the bar members, and the attached nozzle members down one fixed wall and up the other in moving between the two positions.

8. A vehicle having a body with a bottom planar surface, means carried by the body for providing a source of pressurized air, a plurality of longitudinally spaced-apart, transverse extending slots in the bottom surface, nozzle means carried by the body at each slot for directing a stream of pressurized air from the body to lift, support and propel the vehicle, the stream directed from the body at an acute angle to the bottom surface, the slots spaced longitudinally apart at least a distance sufficient to have each stream deflect back from the surface traversed onto the bottom surface, and from the bottom surface back to the traversed surface, without interfering with streams from adjacent slots.

9. A vehicle as claimed in claim 8, wherein the distance between adjacent slots satisfies the equation:

$P > 2D/\tan \alpha$ where $P$ = the distance between adjacent slots;

$D$ = the distance the bottom surface is lifted from the traversed surface when the vehicle is being operated; and $\alpha$ = the acute angle.

10. A vehicle as claimed in claim 9, wherein the vehicle, issuing streams of air with a thickness "t", must be lifted a minimum distance "D" from the traversed surface which distance satisfies the equation:

$D > t/\cos \alpha$

11. A vehicle as claimed in claim 10, wherein the minimum power output of the vehicle required to have the vehicle lifted a minimum distance "D" from the traversed surface must satisfy the equation $$P \text{ (min.)} > \frac{Lt}{t(\sin \alpha) + P(\sin^2 \alpha)}$$

where L is equal to the gross weight of the vehicle.

* * * * *